United States Patent
Norgard (10) Patent No.: US 7,097,228 B1
(45) Date of Patent: Aug. 29, 2006

(54) SECTIONAL COVER FOR OPEN-TOP VEHICLE LOAD BED

(75) Inventor: Michael P. Norgard, 5160 324th St., South, Auburn, WA (US) 98001

(73) Assignee: Michael P. Norgard, Auburn, WA (US)

(*) Notice: Subject to any disclaimer, the term of this patent is extended or adjusted under 35 U.S.C. 154(b) by 0 days.

(21) Appl. No.: 11/356,828

(22) Filed: Feb. 17, 2006

(51) Int. Cl.
B60P 7/02 (2006.01)
(52) U.S. Cl. ............................. 296/100.05; 296/100.03
(58) Field of Classification Search ........... 296/100.02, 296/100.03; 160/206; 220/345
See application file for complete search history.

(56) References Cited

U.S. PATENT DOCUMENTS 4,867,220 A * 9/1989 Matsumoto et al. .......... 160/35
5,823,605 A * 10/1998 Seargeant .............. 296/100.09

* cited by examiner

Primary Examiner—Joseph D. Pape
(74) Attorney, Agent, or Firm—Delbert J. Barnard

(57) ABSTRACT

Parallel, substantially horizontal, upper first tracks (34) extend lengthwise of a vehicle load bed (14). Parallel, substantially horizontal, second tracks that are below the first tracks (34) also extend lengthwise of the load bed (14). Forward guides (44) carried by cover sections (22, 24, 26, 28, 30, 32) travel in the tracks (34) and rear guides (46) travel in the tracks (36). A rear cover section (18) is driven forwardly and rearwardly by a drive mechanism (54, 72, 74, 76). Forward movement of the cover section (18) moves the other movable cover sections (22, 24, 26, 28, 30, 32) into a nested position within the forward cover section (20). Movement of the rear cover section (18) in the opposite direction pulls the cover sections (22, 24, 26, 28, 30, 32) out from the nested position and spread them out over the length of the load bed (14).

10 Claims, 8 Drawing Sheets

SECTIONAL COVER FOR OPEN-TOP VEHICLE LOAD BED

TECHNICAL FIELD

This invention relates to vehicles having open-top load beds, such as pickup trucks, for example. More particularly, it relates to the provision of a sectional cover for the load bed and mechanism for extending and retracting the cover sections.

BACKGROUND OF THE INVENTION

Sectional covers for open-top vehicles are disclosed by the following United States patents: U.S. Pat. No. 2,074,358, granted Mar. 23, 1937, to Edward Carl Vixel and Temple C. Smith; U.S. Pat. No. 3,342,523, granted Sep. 19, 1969, to Charles J. Lutgen; U.S. Pat. No. 3,578,378, granted May 11, 1971, to Edwing Anderson; U.S. Pat. No. 4,832,395, granted May 23, 1989, to Ann B. Lovaas; U.S. Pat. No. 5,067,766, granted Nov. 26, 1991, to Olaf K. Lovaas; U.S. Pat. No. 6,017,082, granted Jan. 25, 2000, to Michael C. Leoni; and U.S. Pat. No. 6,059,349, granted May 9, 2002, to Jerry T. Doll and Duane J. Thomas.

There is a need for a sectional cover for an open-top vehicle load bed that includes a simple, easy-to-operate mechanism for moving the sections between retracted and extended positions. The primary object of the present invention is to fill this need.

BRIEF SUMMARY OF THE INVENTION

The retractable/extendable sectional cover of the present invention comprises a base structure having confronting side portions. The side portions include parallel, substantially horizontal, upper first tracks extending lengthwise of the side portions, and parallel, substantially horizontal, second tracks below the first tracks, extending lengthwise of the side portions. The first tracks have forward ends and the second tracks have forward ends. The side portions also include a pair of parallel, substantially vertical forward tracks extending downwardly from the forward ends of the substantially horizontal first tracks and a pair of parallel, substantially vertical rearward tracks, extending downwardly from the forward ends of the substantially horizontal second tracks.

The cover includes a plurality of inverted, U-shaped cover sections, each having a pair of sides, and said sides having lower ends. The lower ends include forward guides and rearward guides. The forward guides are movable back and forth lengthwise of the substantially horizontal first tracks and are movable from the substantially horizontal first tracks into the substantially vertical forward tracks, and are movable vertically up and down in the substantially vertical forward tracks. The rear guides are movable back and forth lengthwise of the substantially horizontal second tracks and are movable from the substantially horizontal second tracks into the substantially vertical rearward tracks, and are movable up and down in the substantially vertical rearward tracks.

In preferred form, the sectional cover comprises an inverted, substantially U-shaped rear cover section including a pair of sides having lower ends. The sectional cover also includes substantially horizontal third tracks extending lengthwise of the side portions of the base structure, and carriage guided for back and forth movement lengthwise of the third tracks. Each carriage is connected to the lower end of the rear cover section that is on its side of the base structure. Movement of the carriages forwardly will cause a forward movement of the rear cover section. Movement of the carriages rearwardly will cause a rearward movement of the rear cover section.

Preferably, an elongated drive member is connected to at least one of the carriages. This drive member is operable to move the carriage back and forth lengthwise of the substantially horizontal third track.

Preferably, an inverted, U-shaped front cover section covers the regions where the forward ends of the substantially horizontal first tracks meet the substantially vertical forward tracks, and the forward ends of the substantially horizontal second tracks meet the substantially vertical rearward tracks. The forward section is adapted to telescopically receive in it at least some of the cover sections behind it when such sections are moved forwardly.

Other objects, advantages and features of the invention will become apparent from the description of the illustrated embodiment, from the drawings, the claims and the principles that are embodied in the specific structures that are illustrated and described.

BRIEF DESCRIPTION OF THE SEVERAL VIEWS OF THE DRAWINGS

Like reference numerals are used to designate like parts throughout the several views of the drawing, and.

DETAILED DESCRIPTION OF THE ILLUSTRATED EMBODIMENT

Figure 1:
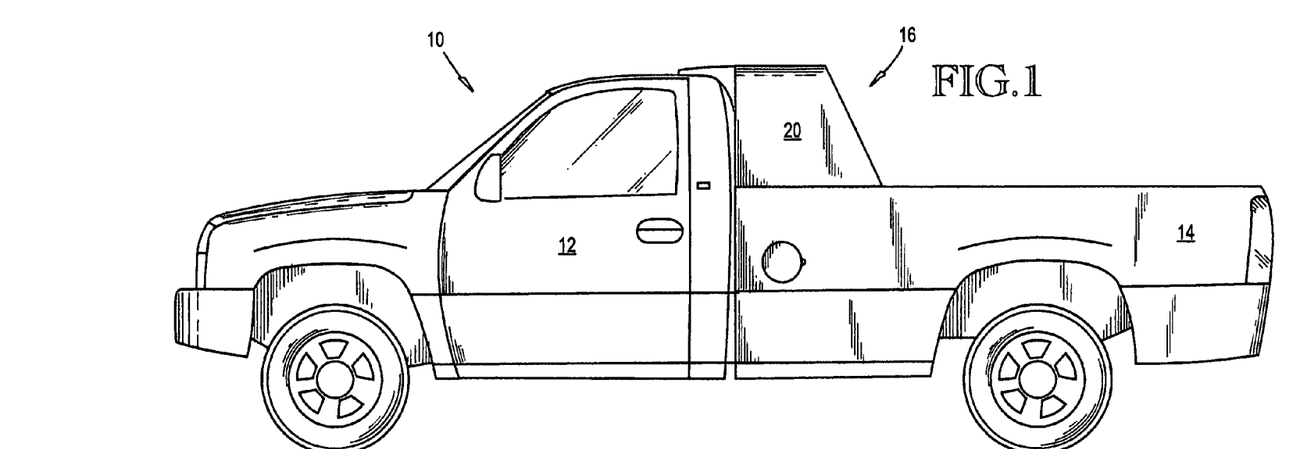
FIG. 1 is a side elevational view of a pickup that includes a sectional cover embodying the present invention, such view showing the cover sections moved forwardly on the pickup.
Figure 2:
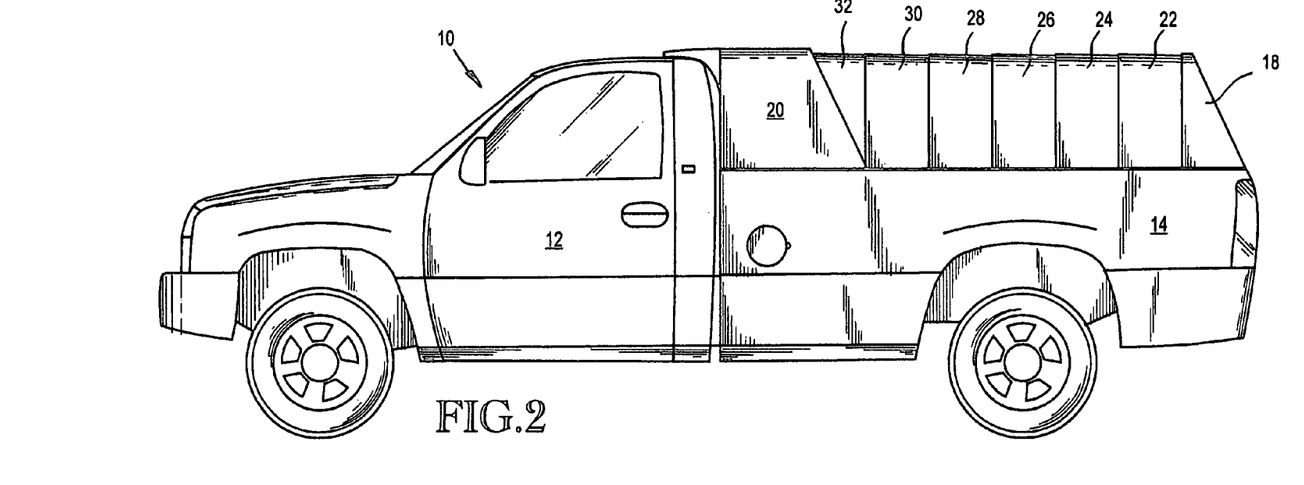
FIG. 2 is a view like FIG. 1, but showing the cover sections moved rearwardly to form a cover that extends over the load bed of the vehicle.
Figure 4:
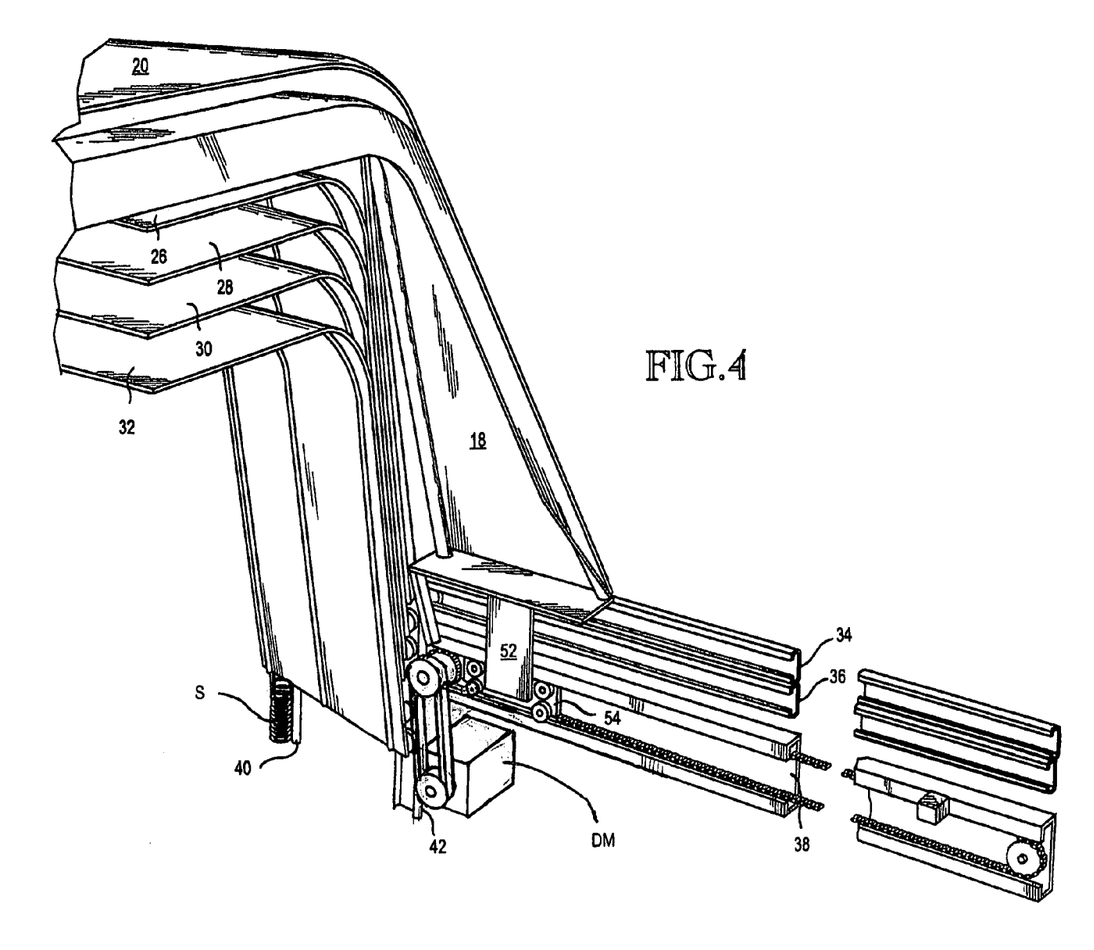
FIG. 4 is a fragmentary pictorial view showing the cover sections rearwardly of the front cover section moved forwardly into the front cover section.

FIGS. 1 and 2 show a vehicle, specifically a pickup 10, having a cab 12 and a load bed 14. Vehicle 10 is provided with a sectional cover 16 for the load bed 14. Cover 16 includes a stationary front section 18, a movable rear section 20 and movable intermediate sections 22, 24, 26, 28, 30 and 32. As shown by FIGS. 1 and 4, the sections of 20, 22, 24, 26, 28, 30 and 32 are housed within front section 18 when the cover section 16 is retracted forwardly into the fixed front section 18. This nesting of the sections 18, 20, 22, 24, 26, 28, 30 and 32 provides an open top for bed 14 in the region rearwardly of the front cover section 18.

Figure 6:
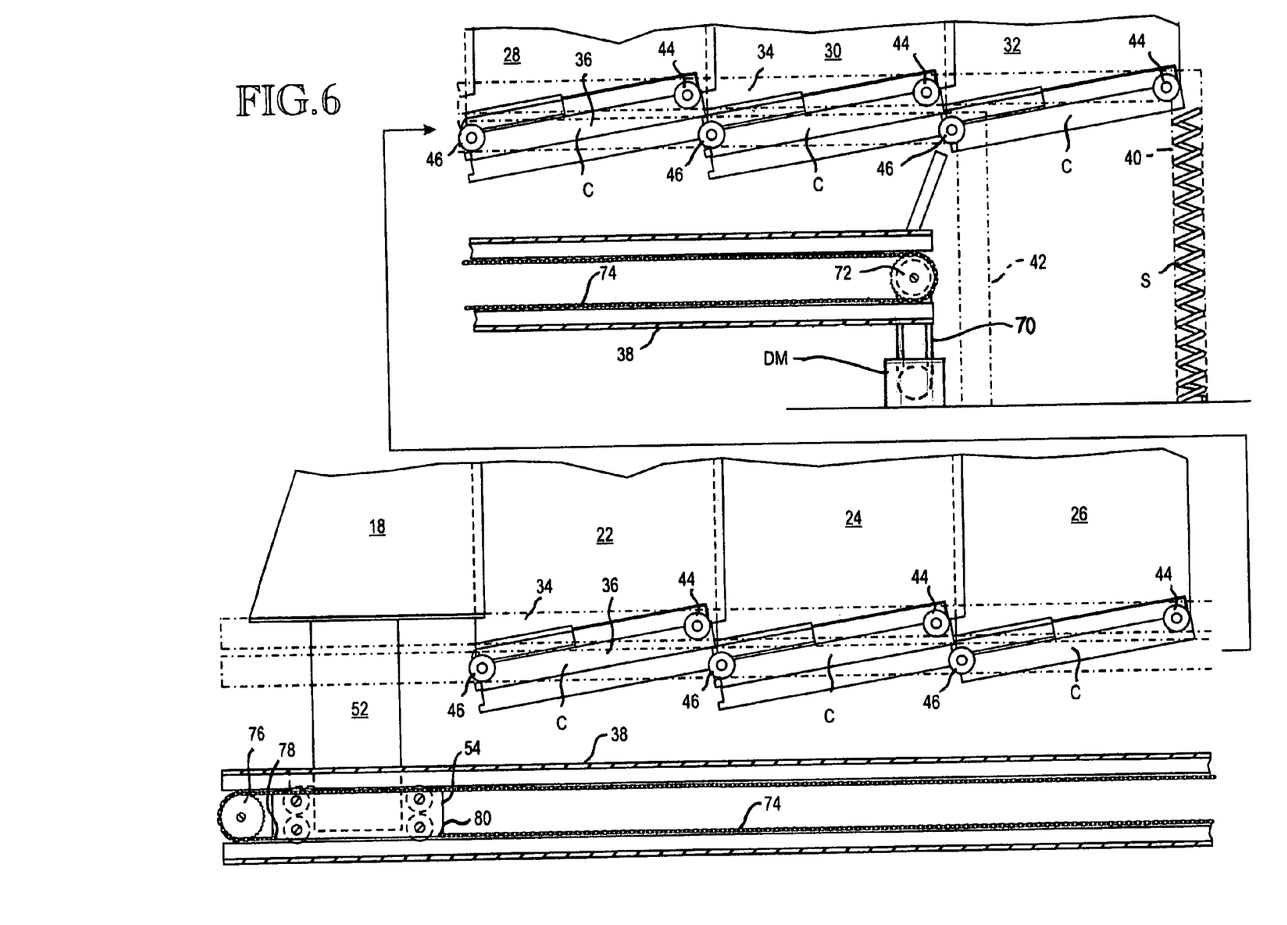
FIG. 6 is a side view the horizontal and vertical tracks, such view showing a front portion of the horizontal tracks, and the vertical tracks positioned above a rear portion of the horizontal tracks.
Figure 7:
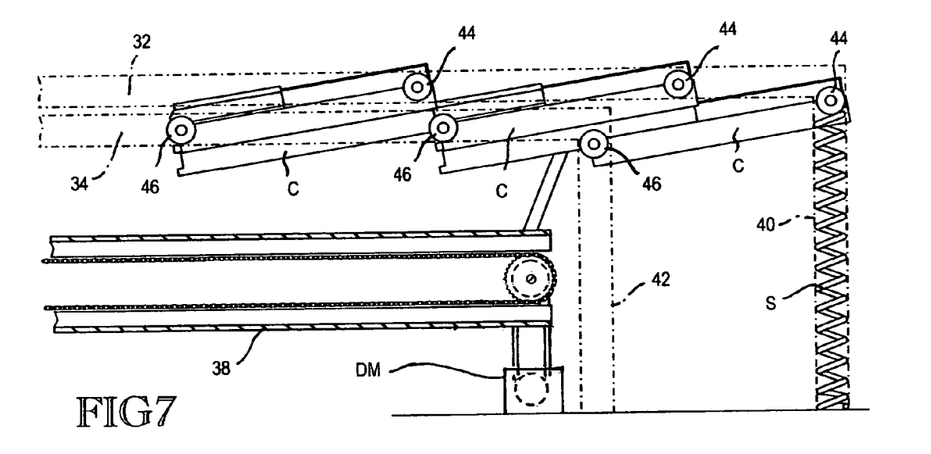
FIG. 7 is a view like the upper portion of FIG. 6, but showing the track guides for the first three sections of the cover moved forwardly and showing the track guides for the first movable cover section moved into the vertical tracks.
Figure 8:
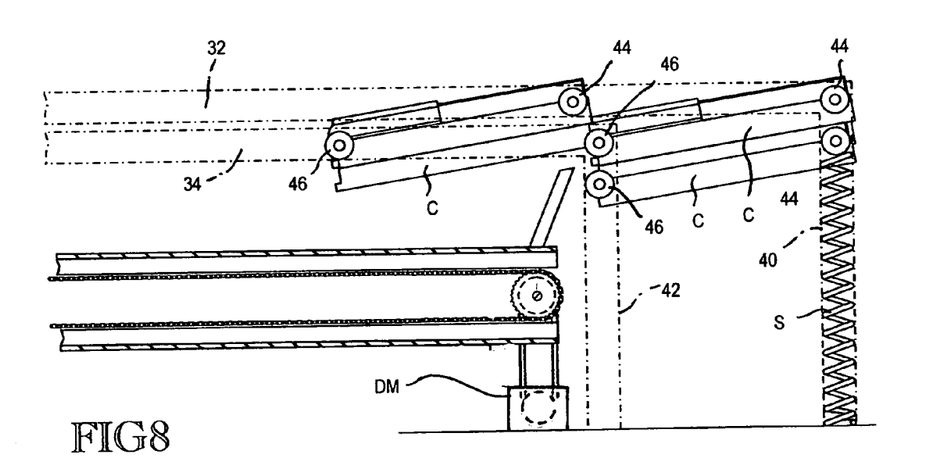
FIG. 8 is a view like FIG. 7, but showing the track guides for the forward movable section being moved downwardly a further amount in the vertical tracks and the track guides for the next movable cover section being moved into the vertical tracks.

FIGS. 6–8 are views looking towards the passenger side of the vehicle 10 but with vehicle sidewall structure omitted for the purpose of showing horizontal and vertical tracks that are parts of a base structure and track guides that are carried by the lower ends of the cover sections 18, 22, 24, 26, 28, 30 and 32. These horizontal and vertical tracks and the track guides are duplicated on the driver's side of the vehicle 10. The tracks and track guides on the two sides of the vehicle 10 are mirror images of each other.

FIG. 6 shows a substantially horizontal first or upper track 34 that extends substantially the full length of the load bed 14. A similar but shorter second track 36 is positioned below upper track 34. A third or bottom track 38 is positioned below track 36. As clearly shown by FIG. 6, the front ends of upper tracks 34 intersect a forward vertical track 40. The front ends of substantially horizontal tracks 36 intersect a second vertical track 42 that is spaced rearwardly from the first vertical track 40 a distance substantially equal to a common width of the movable cover sections 22, 24, 26, 28, 30 and 32. Each movable cover section 32, 30, 28, 26, 24, 22 and 18 includes a guide carrier C into which a forward track guide 44 and a rearwardly track guide 46 are mounted. The track guides 44 engage the upper tracks 34 and the track guides 36 engage the horizontal tracks 36. As shown by FIGS. 6 and 7, the track guides 44 are movable out from engagement with the upper horizontal tracks 34 and into engagement with the forward vertical tracks 40. At the same time, the forward track guides 46 are moved out of engagement with the horizontal tracks 36 and into engagement with the rearward vertical tracks 42.

Figure 3:
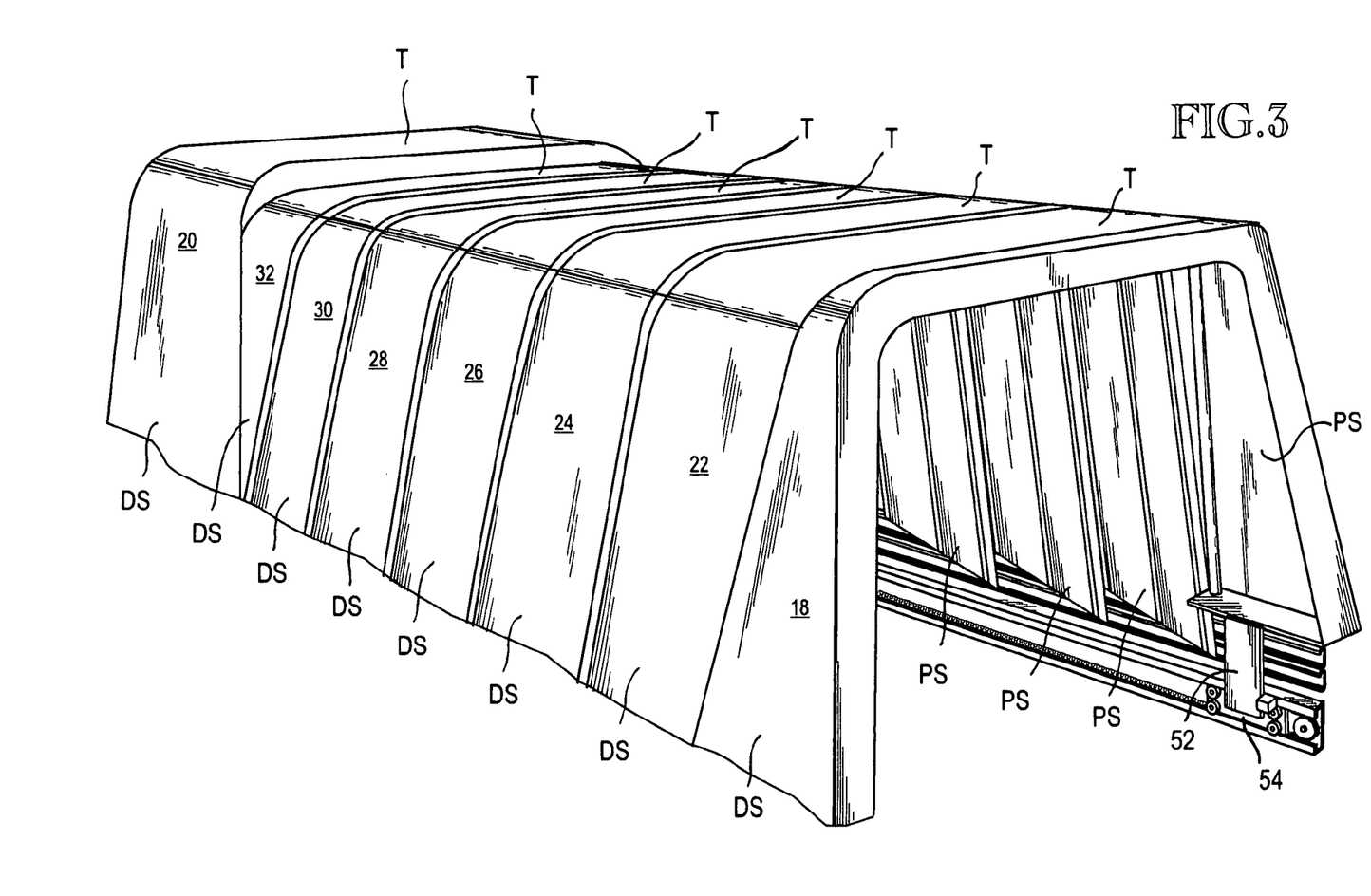
FIG. 3 is a pictorial view of the cover in an extended condition and separated from the vehicle, such view looking towards the top, the driver's side and the rear of the cover.
Figure 5:
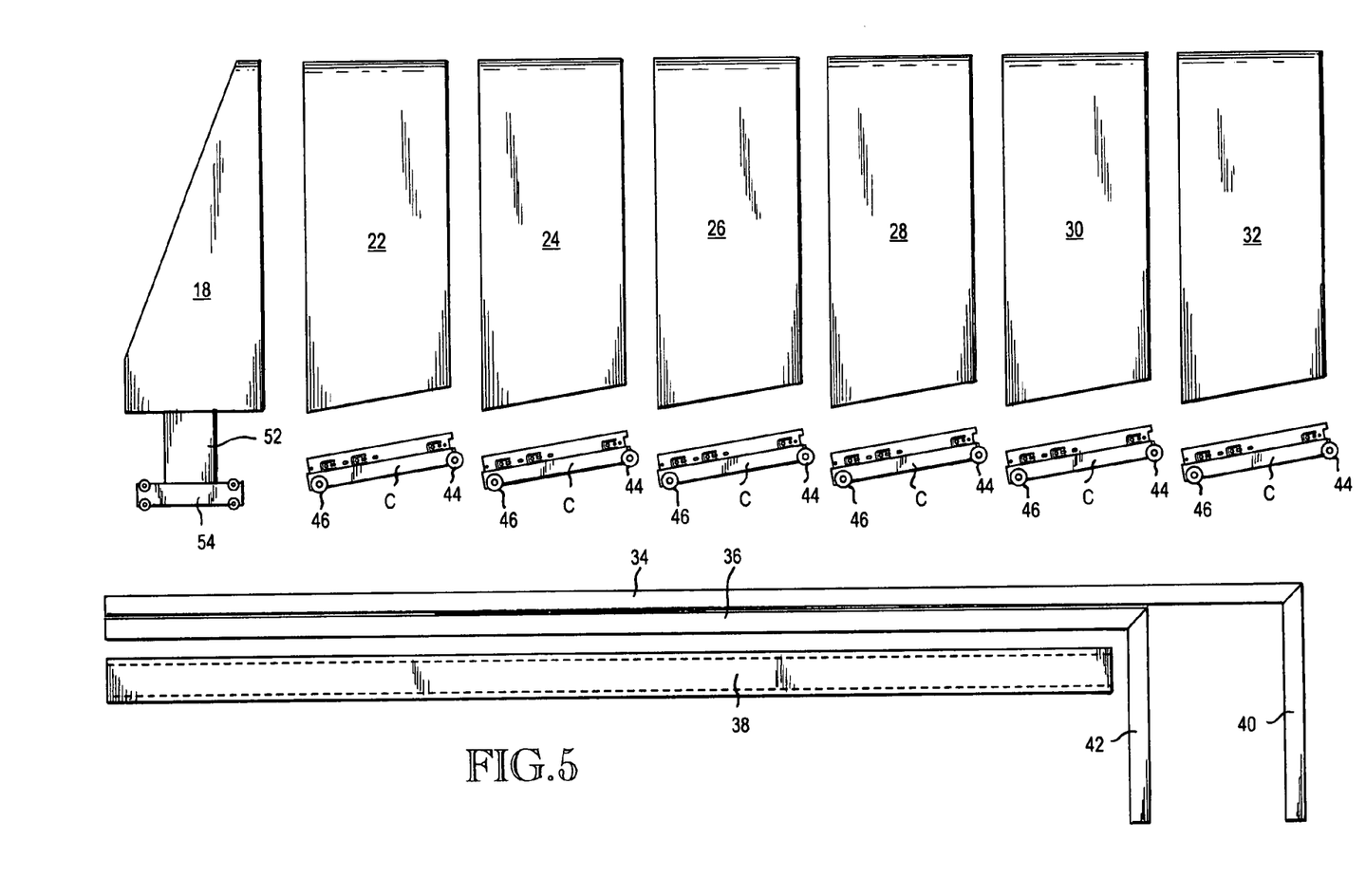
FIG. 5 is an exploded side elevational view of the movable cover sections positioned above the three horizontal and two vertical tracks.
Figure 9:
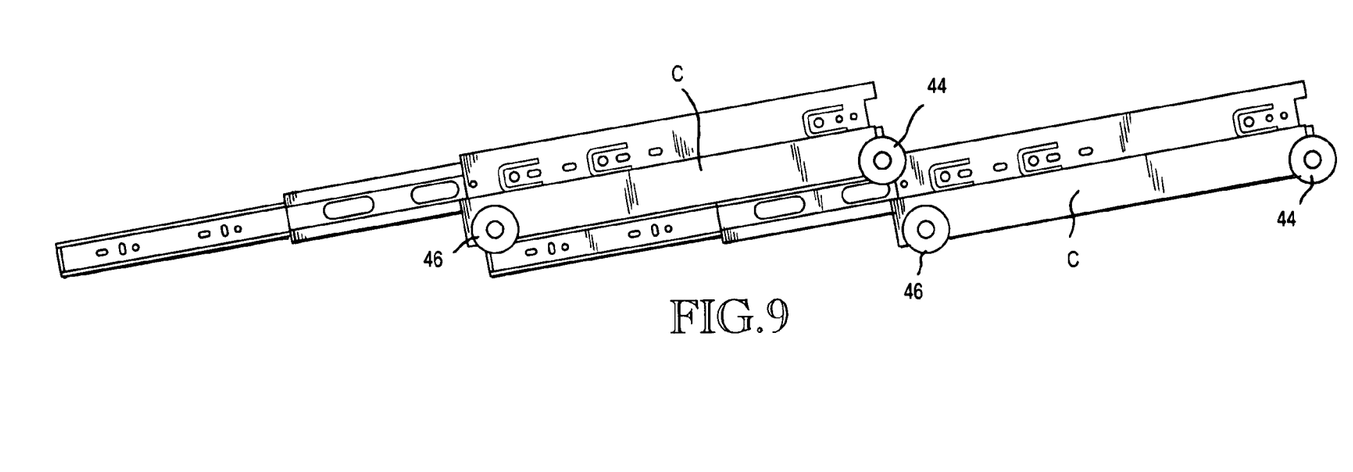
FIG. 9 is a side view of two guide carrying members for an adjacent pair of the cover sections, such view showing the mounting mechanism for the guide carriers in an extended position.
Figure 10:
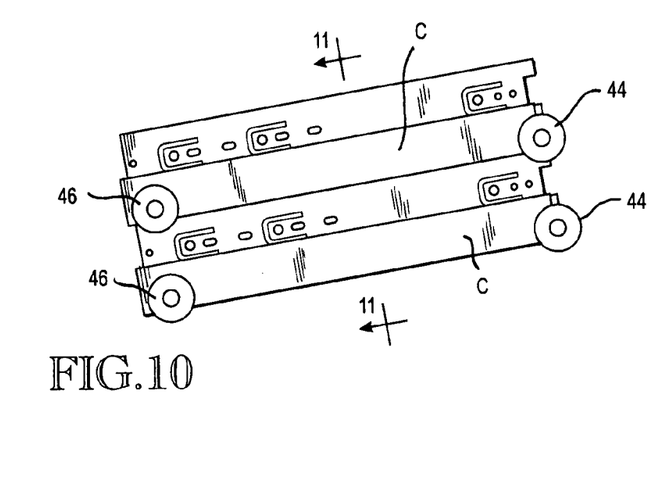
FIG. 10 is a view like FIG. 9, but showing the guide carriers and their support structure in a retracted position.
Figure 11:
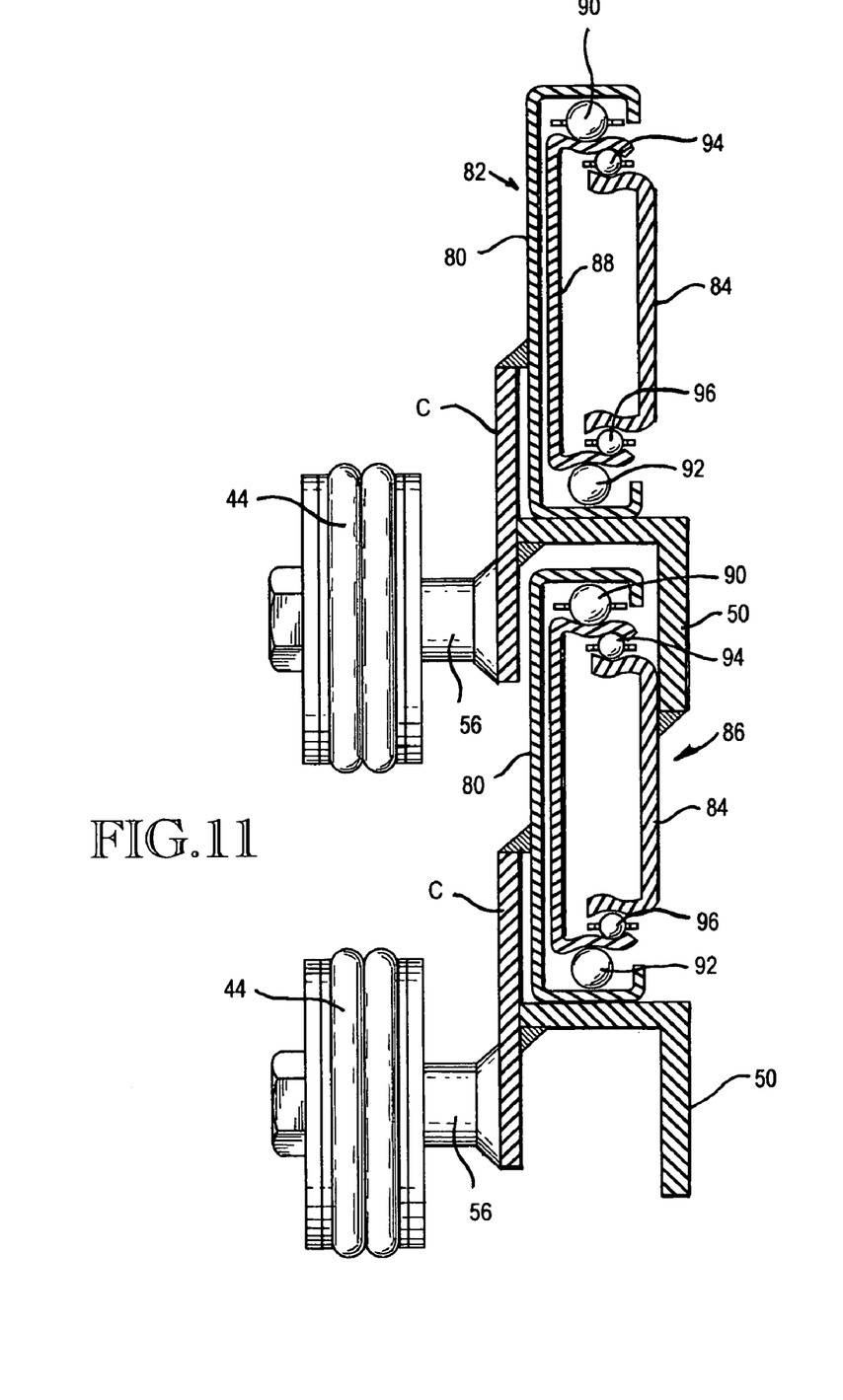
FIG. 11 is a cross sectional view taken substantially along lines 11—11 of FIG. 10.

As shown by FIG. 3, each of the cover sections 18, 20, 22, 24, 26, 28, 30, 32 has an inverted U-shape and includes a top T, a driver's side DS and a passenger's side PS. As best shown by FIG. 5, each cover section side includes a guide carrier C extending along its lower edge. As shown by FIG. 11, the guide carriers C are welded to members 50 that in turn are welded to the sides DS, CS of the cover sections. The guide carriers C are also welded to telescopic sliders similar to the type of sliders that are used to mount drawers to the drawer spaces in desks and the like. FIGS. 9 and 10 show that the slide structure mounts adjacent guide carriers C together for telescopic movement between extended and retracted positions. When adjacent guide carriers C are retracted, as shown in FIG. 10, the upper guide carrier C is held against any further movement to the right relative to the lower guide carrier C. However, the upper guide carrier C can move to the left relative to the lower guide carrier C until the two carriers C are in the position shown by FIG. 9. The slide mechanism prevents a complete separation of the two guide carriers C after they reach the position shown by FIG. 9. The FIG. 9 position is comparable to the position of a drawer that is pulled out from a drawer space in which it is mounted by the slide mechanism. FIG. 10 corresponds to movement of the drawer into the drawer space in the cabinet.

As shown by FIGS. 2–4, the front cover section 20 is the largest section of the group. Section 18 is larger than section 22. Section 22 is larger than section 24. Section 24 is larger than section 26. Section 26 is larger than section 28. Section 28 is larger than section 30. Section 30 is larger than section 32. Sections 22, 24, 26, 28, 30, 32 have tops and sides that flair in the forward direction. This facilitates the nesting of the sections 18, 20, 22, 24, 26, 28, 30, 32 when they are moved forwardly. When the cover sections 18, 20, 22, 24, 26, 28, 30, 32 are in the position shown by FIGS. 2 and 3, the overlapping portions of the cover sections are preferably sealed by a seal strip that is carried by one of the two sections. For example, a substantially U-shape seal strip (not shown) and it may be mounted on the larger of the two cover sections where the two cover sections overlap.

The rear cover section 18 includes a connector 52 that is connected at its top to the lower end of the cover section 18 and at its bottom to a carriage 54. The carriage 54 is shown in FIGS. 4 and 6 to carry four rollers, one at each of its corners. The rollers fit inside of the track 38 which has a channel-shaped cross section that includes a web, two flanges and a pair of inwardly turning lips that are parallel to the web. Tracks 34, 36 also preferably have channel-shaped cross sections with inwardly directed lips on the flanges of the channel. The guides 44, 46 may be wheels which are rotatable about fixed axles 56 that are welded to the carriers C. Or, the guides 44, 46 may be slide blocks that are mounted on the axles 56 for sliding movement inside of the tracks 34, 36.

Herein, the term "base structure" is used to mean a region where the substantially horizontal and substantially vertical tracks are mounted. This region is inwardly adjacent the sidewalls of the load bed of the vehicle, below the lower ends of the cover sections. The horizontal and vertical tracks 34, 36, 38, 40, 42 are mounted on side portions of this base structure. They may be mounted on wall members that are positioned inside of the load bed adjacent the sidewalls of the load bed.

FIGS. 4 and 6–8 show a coil compression spring S located in one of the vertical tracks 40. Preferably, an identical spring is mounted in the other vertical track 40.

A drive motor DM drives a belt or chain 70 which in turn drives a sprocket 72. An endless drive chain 74 extends around the sprocket 72 and around a second sprocket 76 that is at the opposite end of the load bed. Drive chain 74 has two ends 78, 80 that are attached to opposite ends of the carriage 54. The drive chain 74 extends from end 78 around sprocket 76 and then to sprocket 72 and around sprocket 72 and then to end 80. Rotation of the drive motor DM in one direction causes the chain 74 to pull on the carriage 54 and move it towards the front end of the assembly. As carriage 52 moves forwardly, it moves the rear cover section 18 forwardly against cover section 24. The motion is transmitted through the cover sections to the front movable cover section 32, moving it into front cover section 20. As cover section 32 moves forwardly, its guide rollers 44 are moved along the tracks 34 and the guide rollers 46 are moved along the tracks 36. When rollers 44 reach the forward end of tracks 34, they move into the upper ends of the vertical tracks 40. At about the same time, the rollers 46 move into the upper ends of vertical track 42. Cover section 32 then stops moving forwardly and instead moves downwardly. This is because cover section 30 continues to move forwardly, advancing its guides 44 in track 34 and its guides 46 in track 36. As shown by FIGS. 7 and 8, this forward movement of cover section 30 causes the guide carrier C for cover section 30 to move onto and push downwardly against the guide carrier C for cover section 32. Eventually, the guides 44 for cover section 30 move into the upper ends of the vertical tracks 40 and the guides 46 for the same carrier C move into the upper end of vertical tracks 42. Next, the guide carrier C for cover section 28 moves onto the guide carrier C for cover section 30, moving cover section 30 downwardly and its guides 44, 46 downwardly in the tracks 40, 42. This procedure is repeated with the other movable cover sections 26, 24, 22 until the cover sections 22, 24, 26, 28, 30, 32 are nested together below cover section 20, as shown in FIG. 4. The rear cover section 18 is moved into the position shown by FIGS. 1 and 4. As shown by FIG. 4, it moves into the forward cover section 20 but does not move downwardly. When the cover sections 18, 22, 24, 26, 28, 30, 32 are all moved forwardly into cover section 20, the load bed area to the rear of cover section 20 is uncovered and can be accessed from the sides of the load bed as well as by someone climbing up into the load bed. When it is desired to extend the cover, the drive motor DM is driven in the opposite direction, causing the drive chain 74 to pull the carriage 54 rearwardly. As each cover section moves rearwardly, out from the nest of cover sections, its guides 44, 46 move back into the horizontal tracks 34, 36. Coil compression springs S in the vertical tracks 40 push up on the bottom of the stack and help move each cover section back into its horizontal path of movement with its guides 44, 46 are within the horizontal tracks 34, 36.

FIG. 11 shows upper and lower guide carriers C at section 11—11 in FIG. 10. The upper guide carrier C is welded to one side 80 of a telescopic upper slide 82. Each guide carrier C and the angle iron 50 to which it is connected interconnects the opposite sides 80, 82 of a vertically adjacent pair of slides. In FIG. 11, side 84 of slide 86 is telescopically movable relative to side 80 of slide 82. FIG. 11 shows that each slide has three parts. These are side parts 80, 84 and a center part 88. As known in the art, ball bearings 90, 92 are interposed between parts 80, 88 and ball bearings 92, 94 are interposed between parts 84, 88.

The illustrated embodiments are only examples of the present invention and, therefore, are non-limitive. It is to be understood that many changes in the particular structure, materials and features of the invention may be made without departing from the spirit and scope of the invention. For example, the chain/brocket drive mechanism may be replaced by a rotary screw mechanism that is similar to the rotary screw mechanism used for operating a garage door opener. Rotation of the screw in one direction moves the carriage in one direction. Rotation of the screw in the opposite direction moves the carriage in the opposite direction. It is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. A retractable/extendable, sectional cover for an open top vehicle load bed, comprising:
   a base structure having confronting side portions;
   said side portions including:
      parallel, substantially horizontal, upper first tracks extending lengthwise of the side portions, said first tracks having forward ends;
      parallel, substantially horizontal, second tracks below the first tracks, extending lengthwise of the side portions, said second tracks having forward ends;
      a pair of parallel, substantially vertical forward tracks extending downwardly from the forward ends of the first tracks;
      a pair of parallel, substantially vertical rearward tracks, extending downwardly from the forward ends of the second tracks;
      a plurality of inverted, U-shaped cover sections, each having a pair of sides, said sides having lower ends, each including a forward guide and a rearward guide, said forward guides being movable back and forth lengthwise of the first tracks and being movable from the first tracks into the substantially vertical forward tracks, and vertically up and down in the substantially vertical forward tracks; and
      said rear guides being movable back and forth lengthwise of the second tracks and being movable from the second tracks into the substantially vertical rearward tracks, and up and down in the substantially vertical rearward tracks.

2. The sectional cover of claim 1, further comprising an inverted, substantially U-shaped rear cover section including a pair of sides having lower ends, parallel, substantially horizontal third tracks extending lengthwise of the side portions of the base structure, and a carriage for each third track engaging the third track, and being guided for back and forth movement lengthwise of said third track, each said carriage being connected to the lower end of the rear cover section that is on its side of the base structure, whereby movement of the carriages forwardly will cause a forward movement of the rear cover section and movement of the carriages rearwardly will cause a rearward movement of the rear cover section.

3. The sectional cover of claim 2, comprising an elongated drive member connected to at least one of the carriages, said drive member being operable to move the carriage back and forth lengthwise of the substantially horizontal third track.

4. The sectional cover of claim 1, comprising an inverted, U-shaped front cover section covering regions where the forward ends of the substantially horizontal first tracks meet the substantially vertical forward tracks and the forward ends of the substantially horizontal second tracks meet the substantially vertical rearward tracks, said forward section being adapted to telescopically receive at least some of the cover sections behind it when such sections are moved forwardly.

5. The sectional cover of claim 4, further comprising an inverted, substantially U-shaped rear cover section including a pair of sides having lower ends, parallel, substantially horizontal third tracks extending lengthwise of the side portions of the base structure, and a carriage for each third track engaging the third track and being guided for back and forth movement lengthwise of said third track Each said carriage being connected to the lower end of the rear cover section that is on its side of the base structure, whereby movement of the carriage forwardly will cause a forward movement of the rear cover section and movement of the carriages rearwardly will cause a rearward movement of the rear cover section.

6. The sectional cover of claim 5, comprising an elongated drive member connected to at least one of the carriages, said drive member being operable to move the carriage back and forth lengthwise of the substantially horizontal third track.

7. The sectional cover of claim 3, wherein the elongated drive member is an endless chain inside of each third track, adapted to be moved in a first direction for moving the carriages forwardly and in an opposite direction for moving the carriages rearwardly.

8. The sectional cover of claim 6, wherein the elongated drive member is an endless chain inside of each third track, adapted to be moved in a first direction for moving the carriages forwardly and in an opposite direction for moving the carriages rearwardly.

9. The sectional cover of claim 1, wherein the cover sections having forward and rearward guides have slide assemblies between adjacent said cover sections for connecting said sections together for movement between a position in which the forward cover section of the pair is inside the rearward cover section of the pair and a position in which the rearward cover section of the pair is spaced rearwardly from the forward cover section of the pair.

10. The sectional cover of claim 1, comprising a spring adapted to bias the forward and rearward guides upwardly in the substantially vertical tracks towards the substantially horizontal tracks.

* * * * *